July 1, 1941.  D. D. ORMSBY ET AL  2,247,962
VEHICLE
Filed Aug. 7, 1939  3 Sheets-Sheet 3

INVENTORS.
DONALD D. ORMSBY, ANDREW W. PEIRCE
BY Walter E. Schirmer
ATTORNEY.

Patented July 1, 1941

2,247,962

UNITED STATES PATENT OFFICE 2,247,962

VEHICLE

Donald D. Ormsby and Andrew W. Peirce, Buchanan, Mich., assignors to Clark Equipment Company, Buchanan, Mich., a corporation of Michigan Application August 7, 1939, Serial No. 288,796

12 Claims. (Cl. 180—54)

This invention relates to vehicles, and more particularly to vehicles of the general type shown in the copending application of Donald D. Ormsby, Serial No. 256,947, filed February 17, 1939.

In vehicles in which a booster engine system is employed to provide added power for maintaining predetermined speeds on grades and the like, some provision must be made for cooling the booster engine during its operation and for maintaining both engines at a desired operating temperature best suited for efficient and economical operation thereof.

Attempts have been made to supply from a single radiator the cooling fluid utilized for both engines, and while some degree of success is possible with such an arrangement, it is found that during extremely hot weather insufficient cooling is provided due to the lack of sufficient radiator space for dissipating the heat from the fluid as it passes therethrough.

One of the primary objects of the present invention is to provide in a vehicle of this type a cooling system which will be effective to insure maintaining of proper operating temperatures for both the main and booster engines at all times, and which can be automatically controlled so that during cooler operating conditions the engine temperatures will be maintained at the desired point.

Broadly speaking, the present invention contemplates the use of an auxiliary radiator, which is connected in series with the main or conventional radiator and is so controlled that the fluid will not be circulated therethrough until a certain minimum operating temperature has been attained in the cooling circuit. Above such temperatures, the secondary or auxiliary radiator is cut in and supplies a large additional cooling surface in order to maintain the proper operating temperatures. When it is not required that the second radiator be used, suitable thermostatic means is arranged so as to by-pass the auxiliary radiator, and consequently under such conditions only the primary radiator is utilized.

It is necessary that the auxiliary radiator be so arranged as to have cooling air flow constantly available, and for this reason we prefer to mount the auxiliary radiator on top of the cab of the vehicle where it will at all times be exposed to the flow of cooling air. When mounted in such position, it is obviously necessary that some means be provided for preventing loss of cooling fluid from the circuit and to accomplish this, we provide for extending the overflow connection of the conventional radiator into the auxiliary radiator so that the overflow level is above the level of the cooling fluid when the circuit is substantially completely filled with such fluid.

Other objects and advantages of the present invention will be more apparent from the following detailed description which, taken in conjunction with the accompanying drawings, will disclose to those skilled in the art, the particular construction and operation of a preferred form of the invention.

Figure 1:
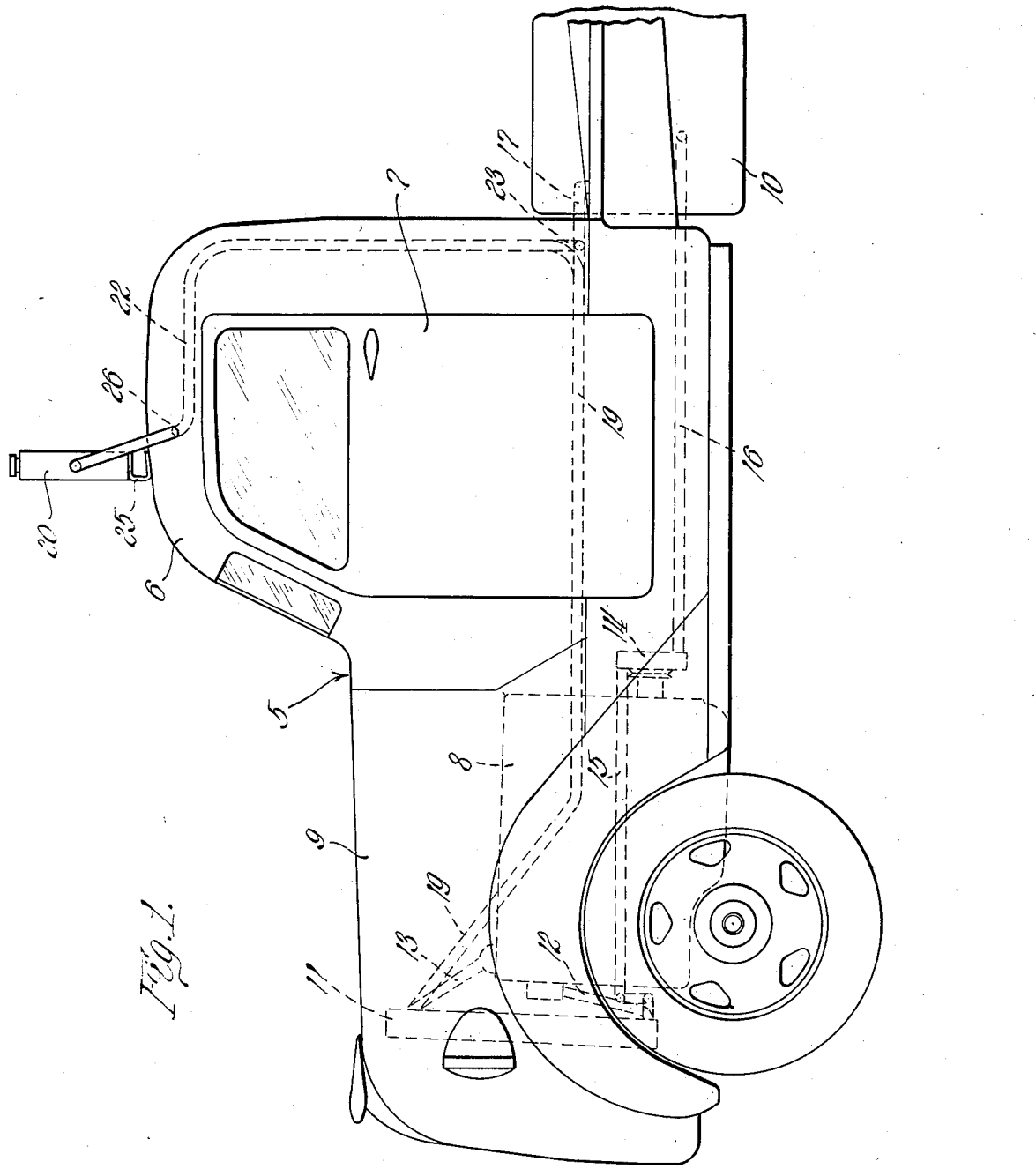
Figure 1 is a side elevational view of a vehicle embodying the present invention.

Considering now the drawings in detail, the truck or tractor indicated generally at 5 comprises the cab portion 6 having doors 7 providing for entrance and egress of the operator, and also provided with the main or conventional engine unit 8 located beneath the hood 9 of the vehicle. A secondary or booster engine 10 is supported in the chassis of the vehicle rearwardly of the cab substantially in the manner described in the copending application referred to above, and is connected into the transmission or other part of the driving train in a manner which need not be explained in detail herein, reference being had to the aforesaid copending application for such details.

A conventional type of radiator 11 is mounted within the engine compartment 9 forwardly of the engine 8, and is provided with suitable connections 12 and 13 for circulating fluid through the engine 8 and through the radiator, the fluid preferably being forced from the engine block through the connection 13 to the top of the radiator, and from the bottom of the radiator through the connection 12 back into the engine block.

Figure 2:
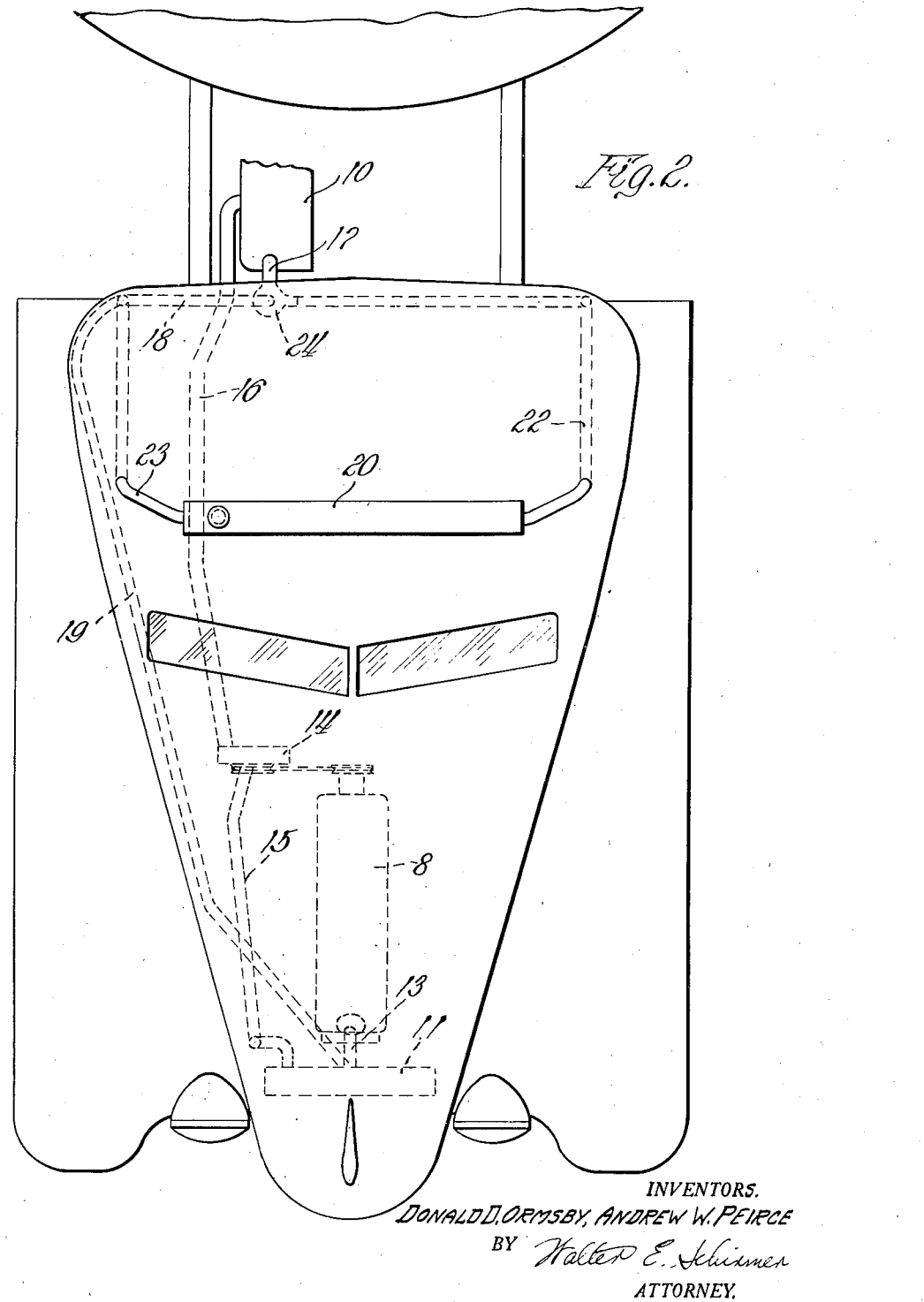
Figure 2 is a top plan view thereof.
Figure 3:
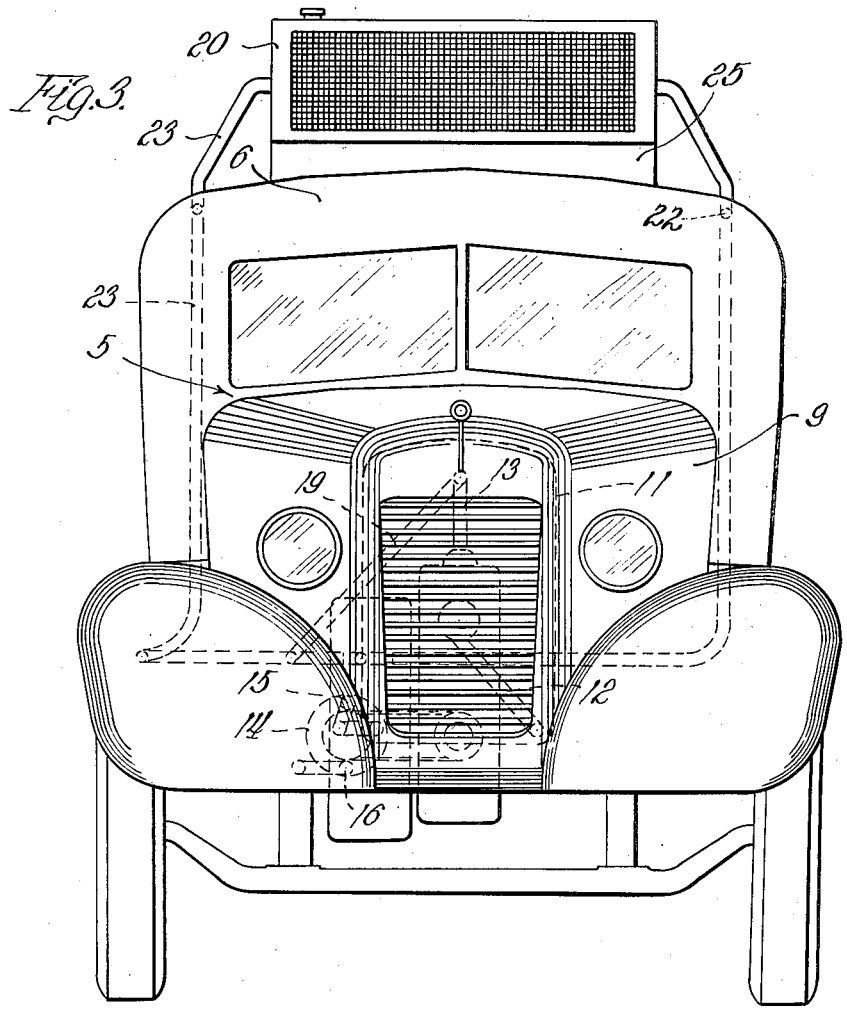
Figure 3 is a front elevational view of the vehicle.

Suitably driven from the main engine 8 is a water pump 14 which may, if desired, be connected to the lay shaft forming the connection between the main engine and the booster engine 10. This water pump is connected in a line 15 leading from the lower end of the radiator 11 through the pump 14 to a line 16 connected into the engine block of the booster engine 10. The pump 14 thereby draws water from the radiator 11 and forces the same through the lines 15 and 16 to the booster engine 10. The outlet of the booster engine is indicated generally at 17, and the cooling fluid is drawn outwardly therethrough and normally circulates through the line 18 and the conduit 19 back to the top of the radiator 11, as clearly shown in Figure 2. Connected in parallel between the booster engine 10 and the line 19 is an auxiliary radiator 20 which has an inlet conduit 22 connected to the outlet 17 for the booster engine, and a return conduit 23 which leads from the auxiliary radiator back into the line 19. Interposed between the lines 18 and 22 and communicating with the outlet 17 is a thermostatic valve indicated generally at 24, this valve being set so that it will close the line 22 as long as the temperature of the cooling fluid leaving the booster engine 10 is below a predetermined minimum. However, when the temperature of this fluid rises above such a minimum, the valve 24 operates to close the line 18 and to open the line 22 so that fluid discharged through the outlet 17 is forced through the line 22 into the auxiliary radiator 20, and is thence returned to the system through the line 23 to the line 19. This affords a greatly increased amount of cooling of the fluid in the radiator 20 so that the fluid being returned to the main radiator 11 from the line 19 will be at a low temperature and will assist in cooling the fluid within the radiator 11.

Figure 4:
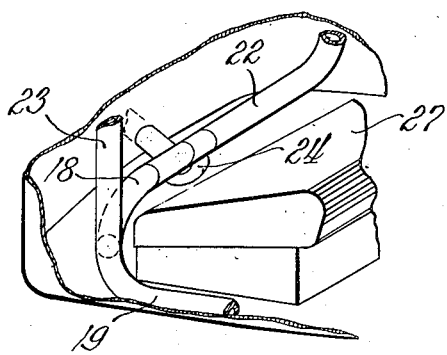
Figure 4 is a detailed perspective view of a portion of the system.

It will be noted that the auxiliary radiator 20 is mounted upon a suitable supporting member 25 secured to the top of the cab 6 in such manner that it will at all times be subject to a strong flow of cooling air. At the same time, the conduits 22 and 23 leading to the radiator 20 are disposed so as to pass into the roof of the cab 6, as indicated at 26, and to then extend downwardly along the rear wall of the cab behind the operator to a point adjacent the rear of the seat, indicated generally at 27 in Figure 4. The valve 24 is also located rearwardly of this seat, and the entire piping of the auxiliary radiator can thereby be disposed out of sight adjacent the back wall of the cab.

The radiator 20 is of a type such as to have a broad frontal area so that maximum cooling within a given height can be obtained as it is not desired that the radiator 20 extend any further than necessary above the roof of the cab 6.

It is therefore believed apparent that we have provided a novel type of auxiliary cooling system for vehicles of the booster engine type, and we therefore do not intend to be limited to the exact details herein shown and described, but only insofar as defined by the scope and spirit of the appended claims.

We claim:

1. The combination, in a vehicle having a main engine, and an auxiliary engine spaced longitudinally in the vehicle, of a main radiator connected to and disposed forwardly of said main engine and having an outlet connection to said auxiliary engine, a return from said auxiliary engine to said main radiator, and an auxiliary radiator disposed forwardly of said auxiliary engine and adapted to be connected into said return in accordance with the cooling requirements of said engines.

2. The combination, in a vehicle having a main engine, and a booster engine disposed rearwardly thereof, of a main radiator common to both engines and disposed forwardly of said main engine, an auxiliary radiator disposed above and forwardly of said booster engine, and means for selectively connecting said auxiliary radiator in series with said main radiator in accordance with the cooling requirements of said engines.

3. In a vehicle having a cab, a main engine mounted forwardly of the cab, an auxiliary engine mounted rearwardly of the cab, a main radiator mounted forwardly of the main engine and common to both said engines, and an auxiliary radiator mounted above said cab and adapted to be connected between said auxiliary engine and said main radiator.

4. A truck including a cab, a main engine supported forwardly thereof, an auxiliary engine mounted rearwardly of and below said cab, a coolant circulating system for said engines including an auxiliary radiator mounted above said cab, and means responsive to the temperature of said coolant for controlling circulation of said coolant through said radiator.

5. The truck of claim 4 wherein said system also includes a main radiator forwardly of the main engine and common to both engines.

6. In combination, in a vehicle having a cab and engines mounted forwardly and rearwardly thereof, a main radiator mounted forwardly of the forward engine, an auxiliary radiator mounted forwardly and above the rear engine, a coolant circulating system for said engines common to said main radiator, means connecting said auxiliary radiator between said rear engine and said main radiator, a bypass for said connecting means, and thermally responsive valve means controlling said bypass.

7. In combination, in a vehicle having longitudinally spaced engines, a main radiator disposed forwardly of the forward engine and connected to both engines, an auxiliary radiator disposed forwardly of the other engine, and means for connecting said auxiliary radiator into the return from said other engine to said main radiator.

8. The combination of claim 7 wherein said connecting means includes a thermally responsive valve.

9. In combination, in a vehicle having a driver's compartment, a main engine mounted forwardly thereof and an auxiliary engine mounted rearwardly thereof, a main radiator disposed in front of the forward engine, an auxiliary radiator mounted intermediate said engines, and connections between both said engines and said main radiator including a bypass to said auxiliary radiator passing through said compartment.

10. In combination, in a vehicle having longitudinally spaced engines, and cooling means therefor including a primary heat dissipating means disposed forwardly of the forward engine and normally connected in parallel to said engines, and a secondary heat dissipating means disposed intermediate said engines and adapted to be connected into series with said primary heat dissipating means under predetermined temperature conditions.

11. The combination of claim 10 wherein said secondary heat dissipating means is mounted above said primary means.

12. In a vehicle, a main engine, an auxiliary engine operable to supplement the main engine, a radiator having connections to said main engine and to said auxiliary engine, a pump driven by said main engine for circulating coolant from said radiator to said auxiliary engine whenever the main engine is operating to maintain said auxiliary engine at operating temperature, and thermally controlled means in said connection between said radiator and auxiliary engine providing for additional cooling of said coolant prior to its return to said radiator.

DONALD D. ORMSBY.
ANDREW W. PEIRCE.